United States Patent
Berthet et al.

(10) Patent No.: US 10,664,620 B2
(45) Date of Patent: May 26, 2020

(54) MODULAR SYSTEM FOR CONTROLLING USABILITY OF A DEVICE

(71) Applicant: SONY MOBILE COMMUNICATIONS INC., Tokyo (JP)

(72) Inventors: David Berthet, Åkarp (SE); Rickard Ljung, Helsingborg (SE)

(73) Assignee: Sony Corporation, Tokyo (JP)

(*) Notice: Subject to any disclaimer, the term of this patent is extended or adjusted under 35 U.S.C. 154(b) by 0 days.

(21) Appl. No.: 16/465,540

(22) PCT Filed: Dec. 20, 2016

(86) PCT No.: PCT/EP2016/081874
§ 371 (c)(1),
(2) Date: May 30, 2019

(87) PCT Pub. No.: WO2018/113914
PCT Pub. Date: Jun. 28, 2018

(65) Prior Publication Data
US 2019/0332813 A1     Oct. 31, 2019

(51) Int. Cl.
*H04L 29/06* (2006.01)
*H04W 24/08* (2009.01)
(Continued)

(52) U.S. Cl.
CPC ......... *G06F 21/70* (2013.01); *G05B 19/0421* (2013.01); *H04W 12/06* (2013.01);
(Continued)

(58) Field of Classification Search
CPC ..... H04W 12/08; H04W 12/06; H04W 88/06; H04W 4/02; H04W 8/18; H04W 12/00;
(Continued)

(56) References Cited

U.S. PATENT DOCUMENTS 7,873,382 B2    1/2011  Rydgren
8,509,737 B2    8/2013  Cantini
(Continued)

FOREIGN PATENT DOCUMENTS

GB    2445778 A    7/2008
WO    2012085593 A1    6/2012
(Continued)

OTHER PUBLICATIONS

International Search Report and Written Opinion from corresponding International Patent Application No. PCT/EP2016/081874, dated Mar. 14, 2017, 7 pages.

*Primary Examiner* — Gary Lafontant
(74) *Attorney, Agent, or Firm* — Tucker Ellis LLP

(57) ABSTRACT

System for controlling usability of an electronic device (1), which host device comprises a processing unit (2), the system comprising a first control module (10), connected to the processing unit, said first control module comprising a modem (11) for communicating with a cellular network, and an access circuit (101) connected to the modem for cellular network access, which access circuit comprises a first secure element (12); a second control module (41) comprising a second secure element (411), configured to communicate with the first secure element over a communication link; wherein said access unit is configured to realize a state machine configured to set a usability state dependent on communication between the first secure element and the second secure element, and to control the device in accordance with said usability state.

20 Claims, 2 Drawing Sheets

(51) Int. Cl.
*G06F 21/70* (2013.01)
*G05B 19/042* (2006.01)
*H04W 12/06* (2009.01)
*H04W 4/80* (2018.01)

(52) U.S. Cl.
CPC ........... *G05B 2219/2231* (2013.01); *G06F 2221/2103* (2013.01); *H04W 4/80* (2018.02)

(58) Field of Classification Search
CPC ..... H04W 12/02; H04W 28/12; H04W 48/14; H04W 48/16; H04W 88/08; H04W 8/20; H04W 4/80; H04W 12/00503; H04W 12/0806; H04W 12/00514; H04W 36/0038; H04L 63/10; H04L 63/20; H04L 47/20; H04L 41/0806; H04L 61/2582; H04L 63/1416; H04L 63/1458; H04L 63/18

See application file for complete search history.

(56) References Cited

U.S. PATENT DOCUMENTS

| | | | |
|---|---|---|---|
| 8,744,403 B2 | 6/2014 | Wu | |
| 8,812,837 B2 | 8/2014 | McCanna | |
| 9,467,187 B2 | 10/2016 | Lee | |
| 2010/0146591 A1* | 6/2010 | Park | H04W 12/0602 726/3 |
| 2013/0035069 A1 | 2/2013 | Fisher | |
| 2015/0042449 A1* | 2/2015 | Suh | G07C 9/28 340/5.7 |
| 2015/0207796 A1* | 7/2015 | Love | H04L 63/10 600/345 |
| 2017/0366575 A1* | 12/2017 | Polepalli | H04L 63/1458 |

FOREIGN PATENT DOCUMENTS

| | | | |
|---|---|---|---|
| WO | 2014092385 A1 | 6/2014 | |
| WO | 2016146209 A1 | 9/2016 | |

\* cited by examiner

MODULAR SYSTEM FOR CONTROLLING USABILITY OF A DEVICE

FIELD OF INVENTION

The present invention relates to a stand-alone module for controlling the usability of a device, locally or remotely controlling such a device. More specifically, the module may be connected to impede full operation of a processing unit of such a device, dependent on communication with another module.

BACKGROUND

An old problem related to any type of device of value, is the risk of losing the device by accident or by theft. It must often be acknowledged that a lost or stolen device will probably not be returned to its rightful owner as long as the device is fully usable and the identity of the owner is unknown. For articles of manufacture, which are configured to be communicatively connected to a network, such as computers and mobile phones, various suggestions have been made regarding means for overcoming this problem. Most existing protection and tracking solutions are built in as a preventive action that needs to be activated by the user in order to protect the device. Existing password based solutions will protect a device to some extent but can be overcome. Existing tracking solutions using accounts and connectivity are dependent on a lot of prerequisites in order to be operational and effective. Other prior solutions include the following disclosures.

U.S. Pat. No. 8,509,737 describes a security module configured to authenticate a telecommunications network. The security module comprises a locking module for disabling usability of an application module, an unlocking module for re-enabling usability of the application module, and a control module for activating the unlocking module depending on received data that is assignable in an authenticated way to a specific telecommunications network (2).

U.S. Pat. No. 8,812,837 relates to a method that incorporates storing, by a universal integrated circuit card (UICC) including at least one processor, a digital root certificate locking a communication device to a network provider, and disabling an activation of the communication device responsive to receiving an indication of a revocation of the stored digital root certificate from a certificate authority.

WO2012085593 discloses a smartcard embedded or inaccessible within a cellular telecommunications device (eUICC), locked to a particular operator, while allowing the operator to be altered legitimately presents a challenge. A method is described using policy control tables, and by maintaining the policy control table, any operator subscription may be downloaded/activated on the smartcard but the device will be prevented from accessing the desired operator because that access would violate the lock rules.

GB2445778 shows a mobile communication device comprises a memory for storing a unique identifier of the device and a processor for determining the lock status of the device—If the processor determines that the device is unlocked, the device transmits to a server an authorization request to operate in the unlocked mode including the unique identifier of the device. The server compares the unique identifier to unique identifiers of devices stored in a database, each identifier associated with a lock status. The device receives from the server the lock status of the device and controls the operation of the device in dependence upon the determined lock status U.S. Pat. No. 8,744,403 provides a method and system for remote control of a smart card. The method comprises that: a smart card management platform receives a request of locking or unlocking a smart card from a subscriber and the smart card management platform performs interactive processing with a terminal side according to the request via a mobile network platform, so as to enable the terminal side to perform the locking or unlocking of the smart card.

WO2014092385 discloses a method for selecting a specific provisioning profile from among a plurality of provisioning profiles and an apparatus using same. In a terminal to which an eUICC is mounted, the eUICC includes at least one provisioning profile wherein each of the one or more provisioning profile enables a user terminal to communicate with a subscriber management entity supporting at least one network provider. Accordingly, a specific provisioning profile can be selected from among the one or more provisioning profiles, and a network can be connected with a specific mobile communication provider using the selected provisioning profile.

U.S. Pat. No. 7,873,382 describes a mobile communication apparatus that includes a remote lock and control function. After theft or loss of the apparatus, it is possible to remotely lock the apparatus by sending a lock command, e.g. an SMS message. The apparatus may also be controlled to upload information enabling the user to retrieve valuable information stored in the apparatus. The apparatus includes a control unit and registers for controlling the operations of the apparatus, including receiving messages. The apparatus further includes locking means capable of detecting codes in messages received and, responsive to detecting a lock code, sending a lock command to the control unit to render the mobile communication apparatus at least partially inoperable.

WO2016/146209 discloses a module for controlling usability of a processing unit of a device, the module comprising a modem for communicating with a cellular network, and an access circuit connected to the modem for cellular network authentication and access, which access circuit comprises or is connected to a secure element. A state machine configured to control the device in accordance with one of a plurality of usability states, including at least a normal state and an alert state, wherein operation of the processing unit is inhibited in said alert state

SUMMARY OF THE INVENTION

The prior art has thus offered different solutions for protecting mobile terminals, configured to operate in a mobile communications network. However, many devices that are not communication terminals as such may indeed also be susceptible to misplacement or theft, or may require management control. The invention targets the general object of controlling the possibility of operating electronic host devices properly.

According to a first aspect, a system is provided for controlling usability of an electronic device, which device comprises a processing unit, the system comprising a first control module, adapted to be connected to the processing unit, said first control module comprising a modem for communicating with a wireless communication network, and an access circuit connected to the modem for access to said wireless communication network, which access circuit comprises a first secure element;

a second control module comprising a second secure element, configured to communicate with the first secure element over a communication link;

wherein said access circuit is configured to set a usability state dependent on communication between the first secure element and the second secure element, and to control the device in accordance with said usability state.

In one embodiment, the first control module is configured to detect an identifier signal from the second control module responsive to the second control module being in connection with or within communication range of the first control module.

In one embodiment, the access circuit is configured to challenge the second secure element by means of the first secure element, and to receive a challenge response from the second secure element.

In one embodiment, the first control module is configured to send data comprising the challenge response to a server through the wireless communication network, using said modem, for validating the identity of the second module.

In one embodiment, the first control module is configured to retrieve access data from the server through the wireless communication network, using said modem, for authenticating towards the second module.

In one embodiment, the first control module is configured to authenticate the second control module over said communication link by means of access data associated with the second secure element.

In one embodiment, the usability state is set dependent on successful authentication with respect to the second control module.

In one embodiment, the first control module is configured to transmit data to the second control module dependent on the state set.

In one embodiment, the access circuit is configured to realize a state machine which is configured to set one of a plurality of predetermined usability states including at least a normal state and an alert state, wherein operation of the processing unit is inhibited in said alert state so as to partially or fully disable the device.

In one embodiment, the first control module is attached to or integrated in the device, and wherein the second control module is attached to or integrated in an accessory unit which is operably connectable to the device.

the first and the second control modules are configured to communicate over a short-range wireless or wired communication link.

According to a second aspect, a method is provided for controlling usability of an electronic device which comprises a processing unit, by means of a first control module connected to the processing unit, which first control module comprises a modem for communicating with a wireless communication network, and an access circuit connected to the modem for accessing said wireless communication network, which access circuit comprises a first secure element, comprising the steps of:

receiving in the first secure element, an identifier signal from a second control module comprising a second secure element, over a communication link;

realizing a state machine in the access circuit;

setting a usability state in the state machine, dependent on communication between the first secure element and the second secure element over the communication link; and controlling the device in accordance with said usability state.

In one embodiment, the method comprises the steps of:
challenging the second secure element by means of the first secure element;

obtaining a challenge response from the second secure element;

identifying the second module based on the challenge response.

In one embodiment, the method comprises the steps of:
retrieving data from a server through said wireless communications network based on the challenge response, using said modem;

obtaining access data based on the retrieved data, usable for authenticating the first secure device with the second secure device.

In one embodiment, the method comprises the steps of, responsive to the usability state being an alert state, inhibiting operation of the processing unit.

BRIEF DESCRIPTION OF THE DRAWINGS

Various embodiments of the invention will be described below with reference to the accompanying drawings, in which.

DETAILED DESCRIPTION OF PREFERRED EMBODIMENTS

In the following description, for purposes of explanation and not limitation, details are set forth herein related to various embodiments. However, it will be apparent to those skilled in the art that the present invention may be practiced in other embodiments that depart from these specific details. In some instances, detailed descriptions of well-known devices, circuits, and methods are omitted so as not to obscure the description of the present invention with unnecessary detail.

The functions of the various elements including functional blocks, including but not limited to those labeled or described as "computer", "processor" or "controller", may be provided through the use of hardware such as circuit hardware and/or hardware capable of executing software in the form of coded instructions stored on computer readable medium. Thus, such functions and illustrated functional blocks are to be understood as being either hardware-implemented and/or computer-implemented, and are thus machine-implemented. In terms of hardware implementation, the functional blocks may include or encompass, without limitation, digital signal processor (DSP) hardware, reduced instruction set processor, hardware (e.g., digital or analog) circuitry including but not limited to application specific integrated circuit(s) [ASIC], and (where appropriate) state machines capable of performing such functions. In terms of computer implementation, a computer is generally understood to comprise one or more processors or one or more controllers, and the terms computer and processor and controller may be employed interchangeably herein. When provided by a computer or processor or controller, the functions may be provided by a single dedicated computer or processor or controller, by a single shared computer or processor or controller, or by a plurality of individual computers or processors or controllers, some of which may be shared or distributed. Moreover, use of the term "processor" or "controller" shall also be construed to refer to other hardware capable of performing such functions and/or executing software, such as the example hardware recited above.

Figure 1:
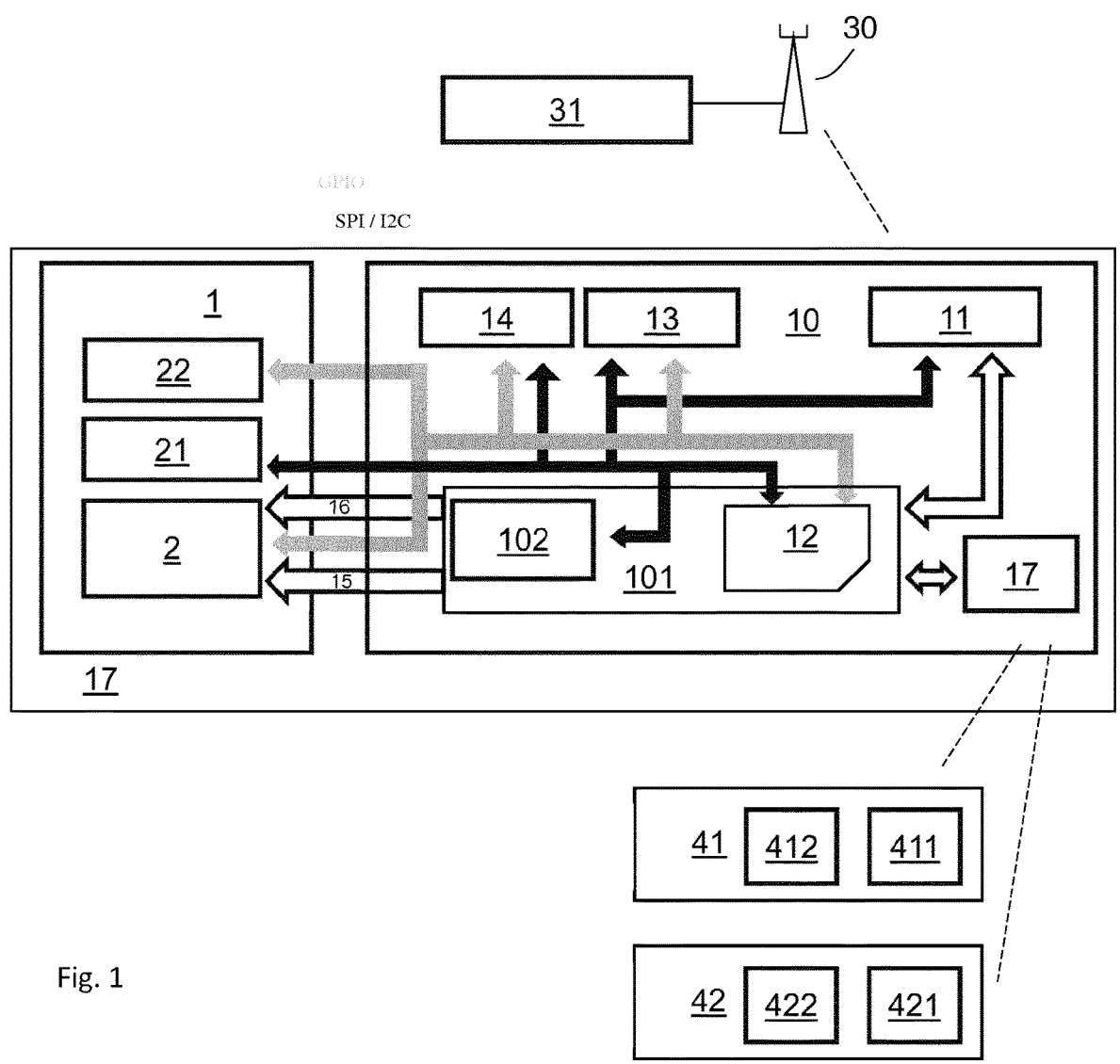
FIG. 1 illustrates a system for controlling usability of a processing unit of a device according to one embodiment.

FIG. 1 illustrates an embodiment of a first control module 10 for controlling usability of a device 1, which first control module 10 may be employed for any type of device 1 incorporating a processing unit 2, such as a central processing unit (CPU). The device to be controlled may also include e.g. a power management circuit 21 and one or more sensors 22. The device is an electronic host device 1, the operation of which is independent of the first control module 10, in a normal state. However, the first control module is connected to control the possibility of normal operation of the device 1, in one or more other states. The first control module 10 is preferably securely connected to the device 1, in wired connection to control operability of the processor 2.

The first control module 10 comprises a modem 11 for communicating with a cellular network, and an access circuit 101 connected to the modem 11 for cellular network authentication and access. The first control module may include or be connected to an antenna, for radio transmission with a cellular network 30, indicated in FIG. 1 by means of a base station. The access circuit 101 comprises or is connected to a secure element 12, and the secure element 12 incorporates a state machine, effected by executable computer code. The state machine may be configured to control the device 1 in accordance with one of a plurality of usability states, including at least two states. Those states include at least a normal state, which may mean a state in which normal operation of the processing unit 2 of the device 1 is allowed or supported. In addition, the plurality of states include an alert state, in which operation of the processing unit 2 is inhibited. The first control module 10 is autonomous and operates on its own, meaning that it is not dependent to any other entities, such as the processing unit 2, to become operational.

In one embodiment, the secure element includes a circuit which is non-detachably connected to the processing unit. The secure element circuit may be soldered to a common circuit board at the processing unit. In an alternative arrangement, the secure element circuit may be provided on a circuit card, which is non-detachably secured in a card reader, which card reader is mechanically connected to the processing unit.

In a preferred embodiment that will be outlined herein, the access circuit 101 incorporates an Embedded Universal Integrated Circuit Card (eUICC) 12. Also the secure element preferably forms part of the eUICC 12. In this respect, it may be noted that one and the same type of hardware circuit may e.g. be flashed to act as an UICC, or simply as an eSE, which may be decided by choice of implementation. In an alternative arrangement, a separate embedded secure element (eSE) may be employed, which has a secure element circuit that is separate from the eUICC. In another embodiment, in which such a separate eSE provides the secure element circuit, may be combined with a standard detachable Subscriber Identity Module (SIM) card, which provides the access circuit. The access circuit 101 may also include a control unit 102, operable to carry out functions by execution of software on the eUICC 12.

The embedded eUICC 12 is preferably compliant with a standard for provisioning over-the-air, and holds at least a security domain with cellular network access capabilities. The security domain, alternatively referred to as a root security domain, includes the necessary applications and the registers to manage and maintain the state of the first control module 10 in terms of usability of a device 1, in other words a state machine. The range of states allowed is defined upon the choice of implementation. As a strict minimum, an alert and a normal state need to be defined. When the state machine of the eUICC is set in alert state the device 1 is not operable unless an alert is resolved and the device 1 goes back to the normal operation as under normal state, as defined by the implementation. The exact definition of operability may be defined through the choice of implementation, but an alert state shall mean that the device 1 cannot be used as intended and that the necessary measures have been implemented to avoid unauthorized change of state.

Figure 2:
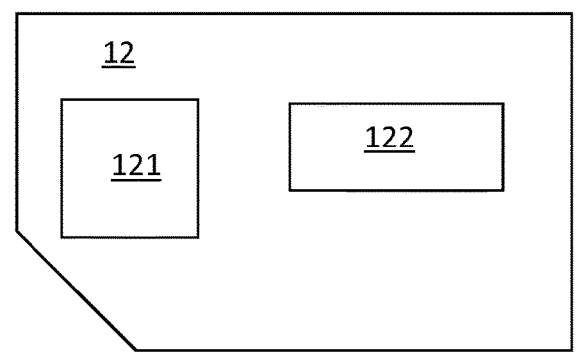
FIG. 2 schematically illustrates an access circuit and a secure element, formed on a common carrier according to one embodiment.

FIG. 2 schematically illustrates a combined access circuit and secure element in the form of an UICC 12. This UICC may e.g. be an eUICC, or e.g. a UICC that in other ways has been non-detachably connected to the modem 11, and in turn to the processing unit 2 of a device 1 under control. The eUICC comprises circuits and memory means configured to store program code forming eUICC operating software (OS) 121. The eUICC OS 121 is configured to implement alert management, integrated with domain management of the eUICC. For this purpose, the eUICC 12 comprises a root security domain 122. The embedded UICC shall not allow the root security domain 122 to be deleted but other security domains can be installed and activated in case the device integrates cellular connectivity in its primary definition, meaning that the device itself already includes a modem. In case of alert, the eUICC OS 121 must secure that the alert event is provided to the root security domain responsible for state control.

In accordance with a preferred embodiment, once an authenticated alert is received by the embedded UICC, the root security domain 122 will perceive the alert in order to perform usability control of the device 1 the first control module 10 is connected to. In one embodiment, the first control module always starts with the root security domain 122 and may switch to a user domain once the usability state, i.e. normal state, has been determined.

Returning to FIG. 1, the first control module 10 is remotely accessible over the cellular network 30 and the state of the eUICC is remotely controllable by an authenticated remote service operated by a server or node 31 connected to the network 30. The authenticated remote service shall be allowed to query the state of the eUICC 12 and request a change of state. The first control module 10 is configured to control the operability of the processing unit 2 of a device by for example controlling the enablement of a system clock 15 or a supply voltage 16 of the processing unit 2. This control may be executed digitally by means of a data setting or signal connected to the processing unit 2. In an alternative embodiment, control may be executed by means of a signal switch, controlled by the first control module 10 to selectively allow or inhibit a signal or power to the processing unit 2. The eUICC 12 may be configured to connect to the processor 2, and also to the GPS and sensors 14, 22, over SPI/I2C as indicated with grey arrows in the drawing. Power managements 21 of the host 1 may also be connected over GPIO to drive components of the first control module 10, as indicated by the black arrow in the drawings. In case the first control module 10 is in an alert state, operability of the processing unit is inhibited or completely disabled and the device cannot be started to become operable. In case an alert is received while the device is fully operational, the first control module is set in an alert state and shall shutdown immediately. Dependent on choice of implementation, the device 1 may be configured to be switched off immediately, or to perform tracking to send its position to the network and simply switch off, or it may enter a low power tracking mode to constantly report state and position to an authenticated remote service. In such an embodiment, the first control module 10 may include a positioning unit 13, e.g. a GPS receiver. Obtained position information, and potentially other information related to the device by means of other sensors 14 may, upon agreement, be forwarded to an authenticated owner or authorities.

Alerts can be triggered both from an authenticated service on the first control module 10 itself or be broadcast from an authenticated remote service 31 over the cellular network 30, but can preferably only be resolved remotely. This allows the implementation of self-request mechanisms where the device itself requests a change of state. In such an embodiment, a state change request event may be self-triggered. It may e.g. be dependent on time, such as a self-lock timer or even be the default state at power up. Alternatively, or in combination, position of the device, as determined by positioning unit 13, may act as a trigger for the first control module 10 to go to alert mode. Alternatively, or in combination, the first control module 10 could be set in alert when manufactured and remotely unlocked when sold. In yet another alternative embodiment, an alert state may be ordered by default when the device is turned off, such that it is always started in alert state.

In a preferred embodiment, the first control module 10 is provided as a standalone chipset, comprising a modem 11 and an eUICC 12, and potentially a positioning unit 13. In one embodiment the standalone chipset may be supported on a common substrate 17, such as a PCB, as the processing unit 2. The first control module 10 and the processing unit 2 are then connected on the PCB 17 such that the first control module 10 is capable of inhibiting proper operation of the processing unit 2, e.g. by being able to disconnect access to supply voltage or to a system clock signal.

The setup as shown in FIG. 1 illustrates a system for controlling usability of the electronic host device 1 which comprises a processing unit 2. This system comprises a first control module 10, connected to the processing unit 2. The first control module 10 comprises a modem 11 for communicating with a cellular network 30, and an access circuit 101 connected to the modem 11 for cellular network access, which access circuit comprises a first secure element 12. In addition, the system comprises at least a second control module 41, comprising a second secure element 411, configured to communicate with the first secure element 12 over a communication link. The system is arranged such that the first control module 10 is configured to realize a state machine configured to set a usability state dependent on communication between the first secure element 12 and the second secure element 411, and to control the device in accordance with said usability state. A security concept is thus implemented here, extended to include interaction between two (or more) security enabled control modules 10, 41, in order to authorize and control the usage of the host device 1, as a combination of the devices, where only one 10 of the devices must include a modem. That first control module 10 may be denoted master device. Other, second, control modules 41, 42 usable in combination with the master device 10 for controlling the host device 1 may be as slave device 41, 42. These slave devices 41, 42 could include a simpler even more low complexity IoT solution, without a wireless modem for cellular communication.

This concept is illustrated in FIG. 1, and with this architecture a communication between the different control modules 10, 41 may be defined for establishing implementation of master and slave functionality. In one embodiment, the master control module 10 will not allow the host CPU 2 to run or being accessed, unless the master 10 detects a slave IoT module 41 or 42, or more than one, with certain properties. Only the master module 10 is required to be remotely controlled via at least cellular connectivity. Hence, the implementation of the slave devices 41, 42 is not required to embed connectivity configuration, such as eUICC 12 and modem 11, as the master module 10. However, a secure method and runtime environment is preferably implemented for identification/authentication control, typically enabled via an embedded secure element.

As described, the access circuit 101, which preferably includes a secure element in an eUICC 12, in the first control module 10 will run a security domain for access control, i.e. to control its state. The state control includes at least definition whether it is in normal state or alert state, e.g. by checking sensor information and the information from the server 31 the device is attached to. In a preferred embodiment, said access control involves identifying and authorizing slave modules 41, 42, by means of the master module 10. One typical implementation could be that the master module 10 is configured to require one slave module 41 to be available, and that the master control module 10 may enter alert state either if there is no slave module 41, 42 detected, or if/when the communication with an access control server 31 indicates that the detected slave module 41 is not among authorized modules.

In one embodiment, the system is configured to set up and make use of a communication link between the first control module 10 acting as a master and one or more second control modules acting as slaves. Preferably the communication link is set up between the first secure element in the access circuit 101, e.g. realized by the eUICC 12, and the second secure element 411, 421 in the slave device(s). The communication could use any type of link, e.g. physical wires, Bluetooth, Wi-Fi etc., and be carried out by means of co-operating communication units 17 and 412, 422. These may include signal transceivers, physical connectors and/or wireless connectors, and may include antennas.

Figure 3:
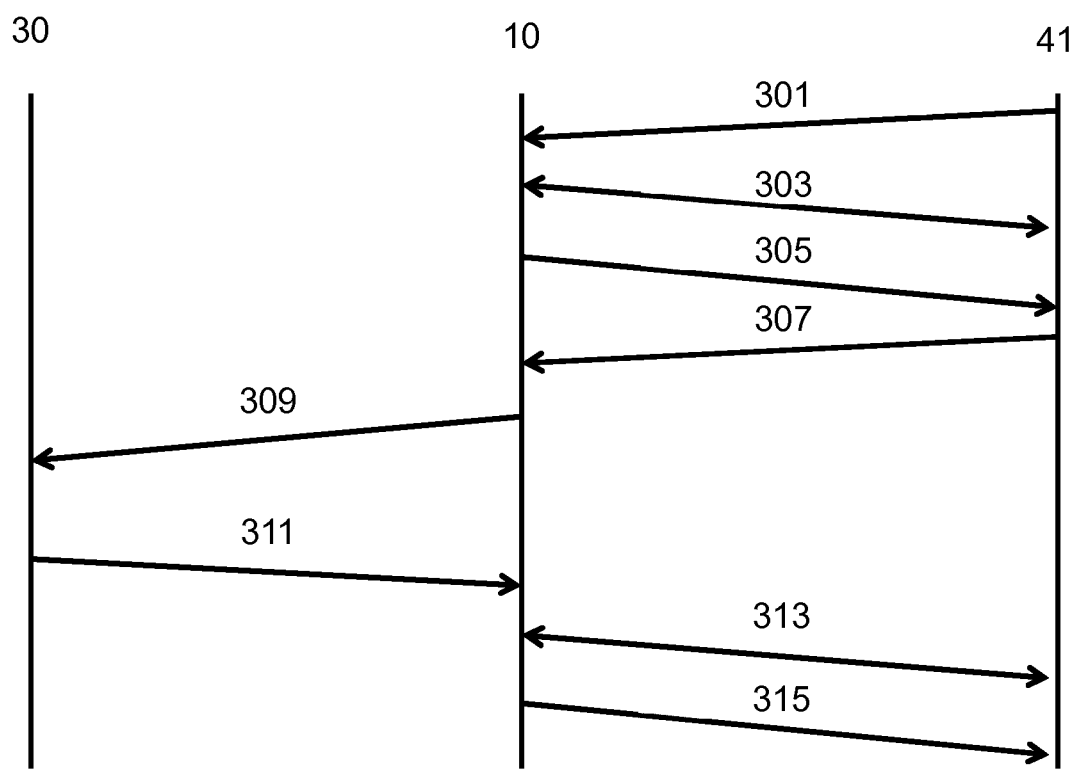
FIG. 3 schematically illustrate a flow chart for a process for operating the embodiment of FIG. 1 according to one embodiment.

FIG. 3 illustrates an example of a high level protocol description of an embodiment of a method according to the invention. It may be noted, though, that other procedures are also possible, which may include more or less amount of signaling, operating under the same general principles. FIG. 3 illustrates communication primarily between the first control module 10, acting as a master for controlling operability of a processor 2 of a host device 1, and a second control module 41, but also some communication with respect to a network server 30, which may be an IoT server, e.g. used for validating access control.

The master 10 may be configured to initiate the setting up of a communication link with a slave 41. The master 10 may be triggered 301 to do so in different ways. In one embodiment, it may be carried out responsive to powering up of the master 10, or as ordered by user interaction. In another embodiment, it may be triggered by means of a command within the access unit, e.g. responsive to information received in the access unit 101, e.g. from a server 30, or based on a timing criteria. It may also be triggered by the detection of a pilot signal or similar from a slave 41 in proximity or physical connection. The actual detection of a signal from the slave 41 may alternatively be carried out responsive to the trigger to set up a communication link, e.g. by configuring the communication unit 17 to listen to a certain channel on which the slave is configured to send a pilot signal.

A communication link is then set up in step 303, so as to open a communication channel between the secure elements in the master 10 and the slave 41. This may be a wired communication channel, or e.g. a radio channel such as Bluetooth or WLAN When a communication link has been set up, an identification request 305 may be sent by the master 10 to the connected slave 41, unless the identity of the slave can be obtained directly from a pilot signal received from the slave 41. Furthermore, if the identity of the slave 41, as detected from e.g. the detection signal 301 or upon setting up the communication link in step 303, is already known to the master 10, e.g. by its ID being stored as a trusted ID in a memory of the slave 10, the slave identification steps 305 and 307 may be left out. Alternatively, the slave identification steps 305 and 307 may nevertheless be carried out, so as to obtain a secure identification of the slave 41 by the master 10. The identification request may have the purpose of obtaining slave identification, and may include the step of transmitting a challenge to from the master 10 to the slave 41. As one example, the challenge of the identification request 305 may comprise a code, e.g. a predetermined code or a random code.

In response, in step 307, the slave 41 will provide one or more identifier(s), which enable the master 10 to obtain one or more access keys usable for authenticating the second secure element 411 by means of the first secure element 12. Such an identifier may e.g. be realized as a bit sequence, or as a flag in a data field. In an embodiment where the identification request 305 includes a challenge, the slave 41 may be configured to send a challenge response 307. The challenge response 307 may e.g. include an encrypted copy of the code received with the identification request signal 305. The slave 41 may thus be configured to encrypt the code with a private key associated with that slave 41.

In one embodiment, as seen in steps 309 and 311, the master may be configured to communicate with a server 30. In such a communication, access data in the form of access key(s) or an access token may be obtained by means of data received 311 from the server 30 through a cellular network 31, using the modem 11, responsive to sending a slave validation request to the server 30 in step 309. In one embodiment, the slave validation request may comprise a challenge response as received by the master 10 in step 307, if the slave 41 was new to the master 10. The received data in step 311 may thus contain a profile of the slave 41, or information for decoding such a profile already stored in the master 10. Such a profile may include information that enables the master device to access the slave device, e.g. access credentials for a pairing process. The profile could also include data that characterizes the slave device, such as type of device, properties of the device etc. In addition, the response 311 may include slave state information, or rule data for a condition associated with the communication between the master 10 and the slave 41, such as a location requirement or a timing requirement, under which communication or authentication between the access circuit 101 and the secure element and 411 may be carried out.

In an alternative embodiment, the access keys may be pre-stored in the master 10, and retrieved by means of the identifier received in step 307, without having to access the server 30. In such an embodiment, the communication of steps 309 and 311 may be carried out even if access data in the form of an access key or token for the slave 41 is stored in the master 10. Such a communication may have the purpose of obtaining e.g. state information, or for updating credentials of a profile associated with the slave 41, so as to update the master 10 if the slave 41 in question e.g. has been redefined at server level 30 from a trusted slave to an untrusted device.

In one embodiment, if the master 10 is not capable of accessing the server 30, e.g. due to lack of communicative range, but an identified slave 41 is already known to the master 10, the master 10 may be configured to be allowed to operate with the slave 41 without checking if the state or credentials of the slave 41 have been updated at server level 30, for at least a predetermined time or until proper connection with the server 30 is obtained.

In one embodiment, where a challenge response is sent to the server 30 in step 309, that challenge response may be decrypted by means of a public key, at the server 30. This decryption may provide the required address information for the server 30 to obtain relevant information with regard to the slave 41, such as said profile.

In one embodiment, the process may stop at the reception of a slave validation response 311 in the master 10. An access token for the slave device 41 may thereby be stored in a memory of the master 10, where it may later be used if the master is required to authenticate the slave 41, as described in the next steps.

In step 313 an authentication process may be carried out whereby the access circuit 101 is configured to authenticate the second secure element 12 by means of the first secure element 12. The slave profile may be configured to procure at least information allowing the master device to access the slave device, and realize a secure pairing of both control modules upon successful authentication of the slave by the master device, if authentication is mandatory. If the master 10, at another point in time, receives or detects a slave identifier for a slave 41 it has already connected to earlier, the master 10 can use already stored information in the master (e.g. a slave access key) to connect with the slave 41.

If the authentication is successful, and potentially also if it fails, the first control module 10 acting as master is configured to transmit the authentication result to the second secure element 411. The first control module 10 is configured to set a usability state dependent on communication between the first secure element 12 and the second secure element 411, and to control the device 1 in accordance with said usability state. In one embodiment, this entails setting the state machine into an alert state if no slave 41 is connected and authenticated. In such an alert state, e.g. caused by authentication failure, may result in a partial or full disablement of the host 1, by inhibiting operation of the host processor 2.

In one embodiment, the slave 41 may report status information to the master 10, which status information may cause the master 10 to affect the operability state. The information can be transmitted to the server 30 in order to take adequate actions. Further, once the master 10 has conducted its state control it may provide access status to the connected slave (s) 41. Such access status may e.g. be such as "All checks are ok"; "Devices are ok to use and no further information is provided"; "Authorization failed, the master is not authorized to be used in combination with this slave". Specific additional information may be provided, e.g. indicating that the slave 41 could not be authenticated, or the master 10 may not be used with this slave 41 at this point of time or similar.

Control modules could be predefined to act as master or slave devices. E.g. a module built on an embedded secure element may only act as slave 41. A module with eUICC+ modem may act as master 10 or slave 41, depending on implemented solution. The system as described may be embodied in many different ways.

In one embodiment, the system is provided for adding secure anti-piracy protection to a removable battery of a security of things enabled battery powered device/host. Such a device may e.g. be a computer, a camera, a vehicle, a tool etc., which device incorporates a processor 2. In such an example the master implementation 10, including a modem 11 and an access circuit 101 with a secure element in e.g. an eUICC 12, could be securely implemented into the battery powered device/host 1. In one embodiment, the first control module 10, acting as master, may be incorporated on a common PCB as the processor 2 of the host 1. Alternatively, the first control module 10 may be securely attached to the host 1, but physically at another location than the processor, though in communicative connection with the processor 2. Preferably, the first control module is in hard wired connection with the processor 2. The slave implementation embodied as a second control module 41, including an embedded secure element 411 and a communication unit 412, may be implemented into the battery, such as on an inside of a battery casing. The slave 41 may connect to the master 10 upon attachment of the battery to the device 1, making use of electric connectors in the battery-device connection. Alternatively, separate connectors 17, 412 may be configured in the interface between master 10, securely attached inside the device 1, and the detachable battery. In yet another embodiment, connection may be wireless but short range. Such short range may be limited to practical communication within one or more meters or even less, such as Bluetooth low energy. In one embodiment, such short range communication link may be proximity-based, using e.g. NFC, between connectors 17 and 412.

In another embodiment, the system of the invention may be configured for adding user access control to a device, e.g. to a vehicle or a certain machine within an industry. The vehicle 1 will than have a first control module 10 therein, acting as master, while a user authentication device includes the second control module 2 acting as slave. Such user authentication device may e.g. be a car key with embedded security electronics 411 and 422, which may connect to a cooperating connector 17 at a predefined location in the vehicle, or simply when present within or at a certain distance from the vehicle. In an even simpler embodiment, the slave may be embodied in a plastic card incorporating an embedded secure element 411 and a coil 412 for RFID communication with a RFID transceiver 17 in the first control module 10.

In yet another embodiment, the master 10 may be incorporated in an electronic device 1, while the slave 41 may be incorporated in a tool for operating, checking, measuring or repairing the device 1. If a tool that is not certified by the manufacturer or provider of the device 1 is used, it will not be possible to authenticate the slave 41 in the tool. Information that the tool will either not be usable for the intended task, or that the device 1 will be made fully or partially disabled if the tool is nevertheless used, may be communicated back to the tool, where e.g. a warning may be displayed or sounded. By setting the first control module 10 in an alert state, such that the processor 2 of the device 1 is operatively inhibited, it may be made impossible to carry out the desired tasks with the tool, and/or to use the device 1.

In another embodiment, an electronic device 1 may be controlled by a master 10 in the form of a first control module 10, which may be set in communicative connection with two or more slave s 41. Successive connection of more than one slave 41, with associated communication pairing and setup as described with respect to FIG. 3, may render a state machine in the first control module 10 to be set in different states. As a mere example, an alert state may be set if only one slave 41 is connected and authenticated, whereas a normal state may be set if also a second slave 41 is connected and authenticated. In an alternative embodiment, a normal state may be set if one slave 41 is connected and authenticated, whereas an alert state is set if also a second slave 41 is detected or connected. In yet another variant, more than one slave 41 may be connected and authenticated, and the state may be set dependent on one or more profiles stored in the first control module 10, or received via the modem 11, associated with the combination of master 10 and slaves 41 in question.

Embodiments of the invention have been discussed in the foregoing on a general level, and with respect to certain embodiments. The first control module 10 may be configured for use to control different types of devices 1, such as e.g. a car, a camera, a computer, a television set etc., even if that device itself does not incorporate cellular network capabilities. The second control module 41 may be incorporated in a member that is detachably connectable to the device 1, or only wirelessly connectable thereto. The embodiment described have in common that the network control of the first control module is separate from the operation of the device as such, whereas control of the device 1 in different states may involve inhibiting full operability of a processing unit of the device, dependent on communication between the first and second control modules. The skilled person will realize that where not contradictory, the disclosed embodiments above may be combined in various combinations.

The invention claimed is:

1. System for controlling usability of an electronic device, which device comprises a processing unit, the system comprising
   a first control module, adapted to be connected to the processing unit, said first control module comprising a modem for communicating with a wireless communication network, and an access circuit connected to the modem for access to said wireless communication network, which access circuit comprises a first secure element;
   a second control module comprising a second secure element, configured to communicate with the first secure element over a communication link;
   wherein said access circuit is configured to set a usability state dependent on communication between the first secure element and the second secure element, and to control the device in accordance with said usability state;
   wherein the first control module is configured to authenticate the second control module, and to enter an alert state either if the second module is not connected or not authenticated, wherein operation of the processing unit is inhibited in said alert state so as to partially or fully disable the electronic device.

2. The system of claim 1, wherein the first control module is configured to detect an identifier signal from the second control module responsive to the second control module being in connection with or within communication range of the first control module.

3. The system of claim 1, wherein the access circuit is configured to challenge the second secure element by means of the first secure element, and to receive a challenge response from the second secure element.

4. The system of claim 3, wherein the first control module is configured to send data comprising the challenge response to a server through the wireless communication network, using said modem, for validating the identity of the second module.

5. The system of claim 4, wherein the first control module is configured to retrieve access data from the server through the wireless communication network, using said modem, for authenticating towards the second module.

6. The system of claim 1, wherein the first control module is configured to authenticate the second control module over said communication link by means of access data associated with the second secure element.

7. The system of claim 6, wherein the usability state is set dependent on successful authentication with respect to the second control module.

8. The system of claim 6, wherein the first control module is configured to transmit data to the second control module dependent on the state set.

9. The system of claim 1, wherein the access circuit is configured to realize a state machine which is configured to set one of a plurality of predetermined usability states including at least a normal state and an alert state, wherein operation of the processing unit is inhibited in said alert state so as to partially or fully disable the device.

10. The system of claim 1, wherein the first control module is attached to or integrated in the device, and wherein the second control module is attached to or integrated in an accessory unit which is operably connectable to the device.

11. The system of claim 1, wherein the first and the second control modules are configured to communicate over a short-range wireless or wired communication link.

12. The system of claim 1, wherein the electronic device is battery powered, wherein the first control module is integrated in the electronic device, and wherein the second control module is integrated in a removable battery for powering the electronic device.

13. Method for controlling usability of an electronic device which comprises a processing unit, by means of a first control module connected to the processing unit, which first control module comprises a modem for communicating with a wireless communication network, and an access circuit connected to the modem for accessing said wireless communication network, which access circuit comprises a first secure element, comprising the steps of:
  receiving in the first secure element, an identifier signal from a second control module comprising a second secure element, over a communication link;
  realizing a state machine in the access circuit;
  authenticating the second control module;
  setting a usability state in the state machine, dependent on communication between the first secure element and the second secure element over the communication link, including entering an alert state either if the second module is not connected or not authenticated; and
  controlling the device in accordance with said usability state, wherein operation of the processing unit is inhibited in said alert state so as to partially or fully disable the electronic device.

14. The method of claim 13, comprising the steps of:
  challenging the second secure element by means of the first secure element;
  obtaining a challenge response from the second secure element;
  identifying the second module based on the challenge response.

15. The method of claim 14, comprising the steps of
  retrieving data from a server through said wireless communications network based on the challenge response, using said modem;
  obtaining access data based on the retrieved data, usable for authenticating the first secure device with the second secure device.

16. The method of claim 13, comprising the step of:
  detecting an identifier signal from the second control module responsive to the second control module being in connection with or within communication range of the first control module.

17. The method of claim 13, wherein the first control module is attached to or integrated in the device, and wherein the second control module is attached to or integrated in an accessory unit which is operably connectable to the device.

18. The method of claim 13, wherein the electronic device is battery powered, wherein the first control module is integrated in the electronic device, and wherein the second control module is integrated in a removable battery for powering the electronic device.

19. An electronic device, comprising
  a processing unit;
  a first control module, connected to the processing unit, said first control module comprising
    a modem for communicating with a wireless communication network; and
    an access circuit connected to the modem for access to said wireless communication network, which access circuit comprises a first secure element;
  wherein the first secure element is configured to communicate with a second control module comprising a second secure element over a communication link;
  wherein said access circuit is configured to set a usability state dependent on communication between the first secure element and the second secure element, and to control the device in accordance with said usability state;
  wherein the first control module is configured to authenticate the second control module, and to enter an alert state either if the second module is not connected or not authenticated, wherein operation of the processing unit is inhibited in said alert state so as to partially or fully disable the electronic device.

20. The electronic device of claim 19, wherein the first control module is configured to detect an identifier signal from the second control module responsive to the second control module being in connection with or within communication range of the first control module.

* * * * *